United States Patent
Nagayasu

(10) Patent No.: US 8,875,760 B2
(45) Date of Patent: Nov. 4, 2014

(54) PNEUMATIC TIRE

(75) Inventor: Masaaki Nagayasu, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 446 days.

(21) Appl. No.: 13/105,551

(22) Filed: May 11, 2011

(65) Prior Publication Data

US 2011/0277896 A1  Nov. 17, 2011

(30) Foreign Application Priority Data

May 11, 2010  (JP) ................................. 2010-108963
Apr. 22, 2011  (JP) ................................. 2011-095800

(51) Int. Cl.
*B60C 11/12*  (2006.01)

(52) U.S. Cl.
CPC ..... *B60C 11/1218* (2013.04); *B60C 2011/1254* (2013.04); *B60C 2011/1213* (2013.04); *B60C 11/1259* (2013.04); *Y10S 152/03* (2013.01)
USPC ................... 152/209.21; 152/DIG. 3

(58) Field of Classification Search
CPC ........................ B60C 11/1204; B60C 11/1218
USPC ................. 152/209.18, 209.21, DIG. 3
See application file for complete search history.

(56) References Cited

U.S. PATENT DOCUMENTS

| | | | |
|---|---|---|---|
| 7,143,799 B2 | 12/2006 | Collette et al. | |
| 2002/0139164 A1* | 10/2002 | Ishihara | 72/326 |
| 2009/0165911 A1* | 7/2009 | Ohashi | 152/209.25 |

FOREIGN PATENT DOCUMENTS

| | | | |
|---|---|---|---|
| CN | 101190644 | | 6/2008 |
| EP | 1170153 | | 1/2002 |
| JP | 06-206407 | * | 7/1994 |
| JP | 3180160 | | 4/2001 |
| JP | 2002-103921 | * | 4/2002 |
| JP | 2002-316517 | | 10/2002 |
| JP | 2004-262285 | | 9/2004 |
| JP | 2005-067274 | | 3/2005 |
| JP | 2005-153870 | | 6/2005 |
| JP | 2005-161967 | | 6/2005 |
| JP | 2006-035933 | | 2/2006 |
| JP | 2006-298055 | * | 11/2006 |
| JP | 2008-087648 | | 4/2008 |
| JP | 2009-126293 | * | 6/2009 |
| JP | 2010-064699 | * | 3/2010 |
| JP | 2011-079406 | | 4/2011 |
| RU | 2388620 | | 5/2010 |
| WO | WO99/48707 | * | 9/1999 |
| WO | WO 2006/013694 | | 2/2006 |

OTHER PUBLICATIONS

English machine translation of JP06-206407, dated Jul. 1994.*
English machine translation of JP2002-103921, dated Apr. 2002.*
English machine translation of JP2010-064699, dated Mar. 2010.*
PCT Application No. PCT/US98/05816; filed Mar. 25, 1998; International Search Report.
German Office Action; dated Mar. 15, 2012.
Japanese Office Action dated Aug. 20, 2013, 7 pages, Japan.
Chinese Office Action dated Apr. 2, 2013, 11 pages, China.

* cited by examiner

*Primary Examiner* — Steven D Maki
*Assistant Examiner* — Robert Dye
(74) *Attorney, Agent, or Firm* — Thorpe North & Western LLP

(57) ABSTRACT

A plurality of sipes extending in a tire width direction are provided in a tread surface of a block. In the sipes, protrusions are formed on a first sipe wall surface of mutually opposing sipe wall surfaces and recesses that engage with the protrusions are formed on a second sipe wall surface. Collapse of portions of the block sandwiched by the sipes is suppressed due to engagement of the protrusions and the recesses. A height of protrusions positioned on an upper portion in the depth direction of the sipes is greater than a height of protrusions positioned on a lower portion.

20 Claims, 7 Drawing Sheets

|  | Conventional Example | Working Example 1 | Working Example 2 | Working Example 3 | Working Example 4 |
|---|---|---|---|---|---|
| Height of Upper Portion Protrusions (mm) | 1.5 | 1.2 | 1.5 | 2.0 | 3.0 |
| Height of Lower Portion Protrusions (mm) | 1.5 | 1.0 | 1.0 | 1.0 | 1.0 |
| Dry Braking | 100 | 100 | 100 | 107 | 105 |
| Braking On Ice | 100 | 100 | 100 | 107 | 105 |
| Braking On Ice When Tire Is 50% Worn | 100 | 102 | 105 | 105 | 105 |

FIG. 3

|  | Conventional Example 1 | Working Example 1 | Conventional Example 2 | Working Example 2 | Conventional Example 3 | Working Example 3 |
|---|---|---|---|---|---|---|
| Height of Protrusions at Both Ends (mm) | 1.5 | 2.0 | 1.5 | 1.0 | 1.5 | 2.0 |
| Height of Protrusions at Center (mm) | 1.5 | 1.0 | 1.5 | 2.0 | 1.5 | 2.0 |
| Height of Protrusions Other than Protrusions at Both Ends and Protrusions at Center (mm) | 1.5 | 1.0 | 1.5 | 1.0 | 1.5 | 1.0 |
| Dry Braking | 100 | 107 | 100 | 105 | 100 | 110 |
| Braking On Ice | 100 | 107 | 100 | 105 | 100 | 110 |

FIG. 7

PNEUMATIC TIRE

PRIORITY CLAIM

Priority is claimed to Japan Patent Application Serial No. 2010-108963 filed on May 11, 2010 and Japan Patent Application Serial No. 2011-095800 filed on Apr. 22, 2011.

BACKGROUND

1. Technical Field

The technology relates to a pneumatic tire and particularly relates to a pneumatic tire having enhanced tire braking performance on ice.

2. Related Art

Tread patterns in which a plurality of sipes is disposed in a tire pattern in order to enhance braking performance on ice of studless tires are known. Also, in recent years, there has been a tendency toward increasing the number of sipes. However, sipe density is increased as a result of increasing the number of sipes, and while this leads to an increase in the number of edges, it also leads to the problems of the overall rigidity of the block declining and braking performance on ice declining.

Therefore, technology has been proposed in which collapsing of portions of a block that are sandwiched by sipes is suppressed and a decline of block rigidity is suppressed by disposing recesses and protrusions within the sipes (see Japanese Patent No. 3180160).

However, an issue still remains because, as wearing of the block progresses, a height of the portions of the block that are sandwiched by the sipes is reduced, and, moreover, rigidity becomes excessive as a result of suppressing the collapsing of the portions of the block by means of the recesses and protrusions.

Additionally, from a perspective of the rigidity of the block, the portions of the block, which are sandwiched by the sipes, located at the edges of the block in the tire width direction are prone to collapse. Moreover, from a perspective of the rigidity of the portions of the block, if a length of the sipes is great, the portions of the block located in a central region in the longitudinal direction will be prone to collapse.

Thus, when there are portions of the block in the longitudinal direction of the sipes that are more prone to collapse compared with other areas, it is difficult to enhance the edge effect.

SUMMARY

The present technology was devised in light of the problems described above and provides a pneumatic tire that is useful in suppressing excessive rigidity and enhancing braking performance on ice even when the wearing of the block has progressed.

The technology also provides a pneumatic tire that enhances braking performance on ice and is useful for suppressing the collapse of portions of blocks positioned in areas that partition sipes in the longitudinal direction of the sipes, which areas are more prone to collapse compared to other areas.

The pneumatic tire of the technology has a plurality of vertical grooves extending in a tire circumferential direction in a tread surface and a sipe extending in a tire width direction in a land portion partitioned by the vertical grooves. In the sipe, protrusions are formed on a first sipe wall surface of mutually opposing sipe wall surfaces and recesses that engage with the protrusions are formed in a second sipe wall surface. The protrusions have a height in a direction perpendicular to the sipe wall surface, and a height of protrusions positioned on an upper portion in a depth direction of the sipe is greater than a height of protrusions positioned on a lower portion.

Additionally, the technology provides a pneumatic tire having a plurality of vertical grooves extending in a tire circumferential direction in a tread surface and a sipe extending in a tire width direction in a land portion partitioned by the vertical grooves. In the sipe, protrusions are formed on a first sipe wall surface of mutually opposing sipe wall surfaces and recesses that engage with the protrusions are formed in a second sipe wall surface. The protrusions have a height in a direction perpendicular to the sipe wall surface, and the height of the protrusions varies in a longitudinal direction of the sipe so that portions of the block partitioning the sipe collapse uniformly in the longitudinal direction of the sipe.

With the technology, when a tire is new, the protrusions that protrude a large amount engage with the recesses. Therefore, the collapsing of the portions of the block that partition the sipes is suppressed and braking performance on ice is enhanced. Additionally, after the tire is worn, since rigidity of the portions of the block increases, next the protrusions that protrude a small amount engage with the recesses. Therefore, the suppression of the collapsing of the portions of the block is prevented from becoming excessive, the rigidity of the block is roughly uniformly maintained from when the tire is new through to after it is worn, and braking performance on ice is maintained.

Moreover, with the technology, since the portions of the block collapse uniformly in the longitudinal direction of the sipes, a bottom-raising effect in the area of the portions of the block that are prone to collapsing can be obtained, and a decline of the rigidity of the block can be suppressed when the tire is worn without reducing the number of sipe edges. Therefore, braking performance on ice is enhanced.

BRIEF DESCRIPTION OF THE DRAWINGS

FIG. 3 is a table showing test results for dry braking, braking on ice, and braking on ice when the tire is 50% worn.

FIG. 7 is a table showing test results for dry braking and braking on ice.

DETAILED DESCRIPTION

Figure 1A:
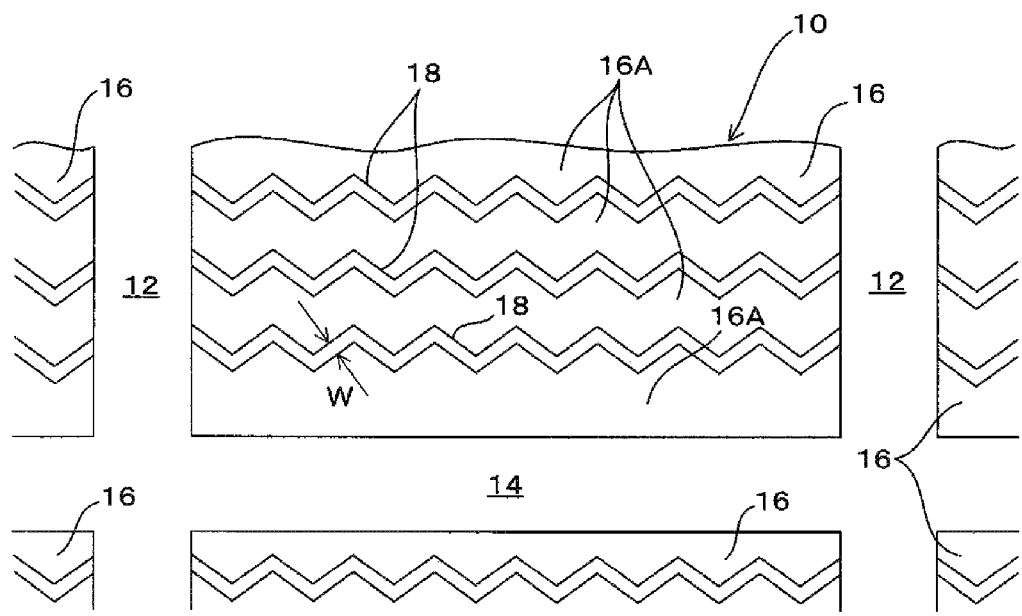
FIG. 1A is a plan view of the portions of a block.

Reference will now be made to the examples illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

First Embodiment

As illustrated in FIGS. 1 and 2, a plurality of vertical grooves 12 extending in a tire circumferential direction and a plurality of lateral grooves 14 that intersect with the vertical grooves 12 are provided in a tread surface 10. Additionally, a land portion provided with a block 16 is provided in the tread surface 10.

Moreover, a plurality of sipes 18 extending in a tire width direction is provided in the tread surface 10 of the block 16 (land portion).

A plurality of portions 16A of the block 16 sandwiched by the sipes 18 and portions 16A of the block 16 sandwiched by the sipes 18 and the lateral grooves 14 are positioned on the tread surface 10 side of the block 16 due to the plurality of sipes 18. In other words, these portions 16A of the block 16 partition the sipes 18.

In order to exert edge effect effectively, a width W of the sipes 18 is preferably 0.3 mm or greater but 1.5 mm or less.

As illustrated in FIG. 1A, a shape in the longitudinal direction of the sipes 18 may be set as desired and, for example, may extend in a zigzag shape.

Figures 2A, 2B, 2C:
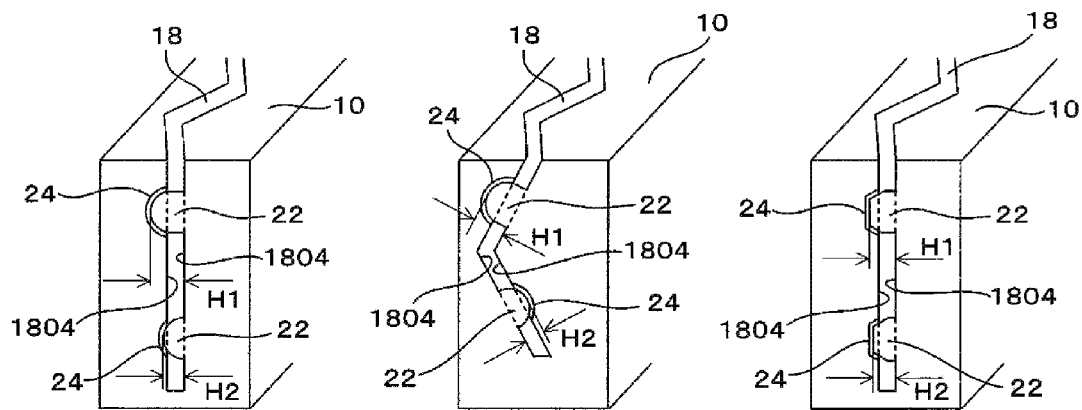
FIGS. 2A, 2B, and 2C are explanatory views of the sipe, the protrusions, and the recesses; and are also perspective views of cross-sections of the portions of the block.

As illustrated in FIGS. 2A and 2C, a depth of the sipes 18 may extend linearly in a direction perpendicular to the tread surface 10, or alternately, as illustrated in FIG. 2B, may extend in a bent manner from the tread surface 10.

With this embodiment, the sipes 18 have a uniform depth in the longitudinal direction thereof, with the exception of both ends. Both ends are configured so as to have a bottom-raising portion 1802 where a bottom surface is gradually raised.

In the sipes 18, protrusions 22 are formed on a first sipe wall surface of mutually opposing sipe wall surfaces 1804 and recesses 24 that engage with the protrusions 22 are formed in a second sipe wall surface. Collapsing of portions 16A of the block 16 sandwiched by the sipes 18 is suppressed due to the engaging of the protrusions 22 and the recesses 24.

Specifically, a plurality of the protrusions 22 and the recesses 24 are provided in the longitudinal direction of the sipes 18 and the depth direction of the sipes 18 at an interval.

The protrusions 22 have a height in a direction perpendicular to the sipe wall surfaces 1804.

As illustrated in FIGS. 2A and 2B, portions of the protrusions 22 protruding from the sipe wall surfaces 1804 may be provided with a cylindrical shape and ends thereof may be provided with a hemispherical shape. Alternately, the portions of the protrusions 22 protruding from the sipe wall surfaces 1804 may be provided with a hemispherical shape. Furthermore, as illustrated in FIG. 2C, portions of the protrusions 22 protruding from the sipe wall surfaces 1804 may be provided with a cylindrical shape and the ends thereof may be provided with a truncated conical shape. In short, it is sufficient that the protrusions 22 and the recesses 24 be provided with shapes that mutually engage when the portions 16A of the block 16 collapse so as to suppress the collapsing of the portions 16A of the block 16.

As illustrated in FIGS. 2A to 2C, a height H1 of the protrusions 22 positioned on an upper portion in the depth direction of the sipes 18 is greater than a height H2 of the protrusions 22 positioned on a lower portion.

In this case, the height H2 of the lower protrusions 22 is preferably from 0.5 mm to 1.5 mm, and the height H1 of the upper protrusions 22 is preferably from 0.5 mm to 3.0 mm greater than the height H2.

Figure 1B:
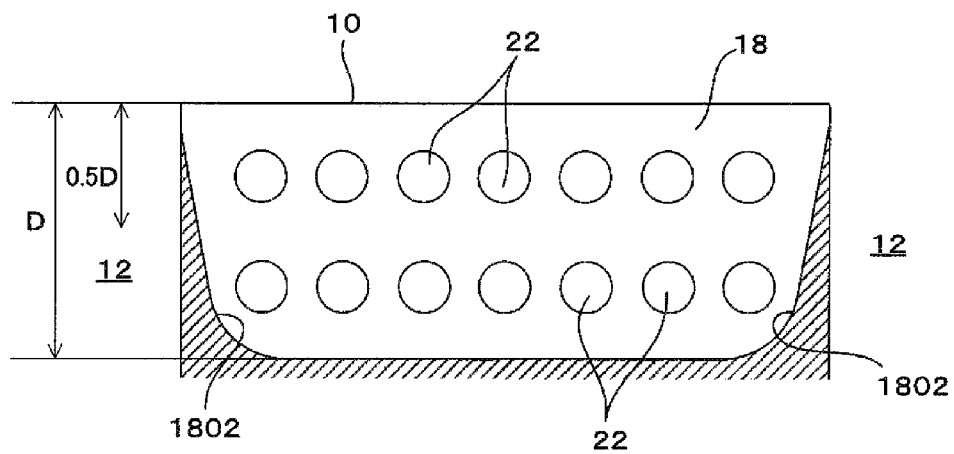
FIG. 1B is a cross-sectional view cut at a portion of a sipe and is also an explanatory view of the protrusions.

Additionally, as illustrated in FIG. 1B, the protrusions 22 having the large height H1 are preferably protrusions 22 positioned in a range 50% of a maximum depth D of the sipes 18 from the tread surface 10. In other words, when the maximum depth of the sipes 18 is D, the protrusions 22 having the large height H1 are preferably protrusions 22 positioned in a range 1/2D from the tread surface 10.

By providing such protrusions 22 and recesses 24 on the sipe wall surfaces 1804, the protrusions 22 and the recesses 24 engage and collapsing of the portions 16A of the block 16 is suppressed. Thereby, a decline in a contact area is suppressed and deformation of the block 16 is suppressed, which are beneficial for enhancing braking performance on ice.

To explain more specifically, in a new tire, the protrusions 22 that protrude a large amount engage with the recesses 24. Thereby, collapsing of the portions 16a of the block 16 of the tread surface 10 side that are tall and experience a great amount of collapse is suppressed and a decline in the rigidity of the block 16 is suppressed, which are beneficial for enhancing braking performance on ice. Additionally, sipe peeling is reduced, which is beneficial for suppressing uneven wear.

Additionally, after the tire is worn, the protrusions 22 that protrude a large amount are worn away, the height of the portions 16A of the block 16 is reduced, and the rigidity of the portions 16A of the block 16 increases. Therefore, next, the protrusions 22 that protrude a small amount engage with the recesses 24. Thereby, while the collapsing of the portions 16A of the block 16 having high rigidity is suppressed, this suppression is prevented from becoming excessive. In other words, collapsing of the portions 16A of the block 16 to a degree that allows for edge effect to be exerted is made possible and the rigidity of the block 16 is roughly uniformly maintained from when the tire is new through to after it is worn, which are beneficial for maintaining braking performance on ice.

Example 1

Radial studless tires having a tire size of 195/65R15 provided with protrusions 22 having the configurations shown in FIG. 3 and recesses 24 that engage with these protrusions 22 were assembled on rims having a rim size of 15×6J. The tires were inflated to an inner pressure of 200 kPa and mounted on the four wheels of an RV vehicle having an engine displacement of 2,000 cc. Tests for a Conventional Example and Working Examples 1, 2, 3 and 4 were conducted for dry braking, braking on ice, and braking on ice when the tire is 50% worn.

Note that the width W of the sipes 18 was 0.4 mm, the depth D was 6 mm, and the length L was 10 mm.

Additionally, the upper portion protrusions 22 were positioned at a depth 2 mm from the tread surface 10, and the lower portion protrusions 22 were positioned at a depth 4 mm from the tread surface 10.

Dry braking was measured as a braking distance from a point of brake application to stop when travelling on a dry asphalt road surface at a speed of 100 km/h. Using the reciprocal of the braking distance, the results were expressed as index values with an index value of the Conventional Example being 100. Larger index values indicate superior braking performance.

Braking on ice was measured as a braking distance from a point of brake application to stop when travelling on ice at a speed of 40 km/h. Using the reciprocal of the braking distance, the results were expressed as index values with an index value of the Conventional Example being 100. Larger index values indicate superior braking performance.

It is clear from the Working Examples 1 and 2 shown in FIG. 3 that by providing a difference between the heights of the upper portion protrusions 22 and the lower portion protrusions 22, braking on ice when the tire is 50% worn can be enhanced.

Additionally, it is clear from Working Examples 3 and 4 that when the difference between the heights of the upper portion protrusions 22 and the lower portion protrusions 22 is large, dry braking, braking on ice, and braking on ice when the tire is 50% worn can be enhanced.

Second Embodiment

As illustrated in FIGS. 4 and 5, a plurality of vertical grooves 12 extending in a tire circumferential direction and a plurality of lateral grooves 14 that intersect with the vertical grooves 12 are provided in a tread surface 10. Additionally, a land portion provided with a block 16 is provided in the tread surface 10.

Moreover, a plurality of sipes 18 extending in a tire width direction is provided in the tread surface 10 of the block 16 (land portion).

A plurality of portions 16A of the block 16 sandwiched by the sipes 18, and portions 16a of the block 16 sandwiched by the sipes 18 and the lateral grooves 14 are positioned on the tread surface 10 side of the block 16 due to the plurality of sipes 18. In other words, these portions 16A of the block 16 partition the sipes 18.

In order to exert edge effect effectively, a width W of the sipes 18 is preferably 0.3 mm or greater but 1.5 mm or less.

Figure 4A:
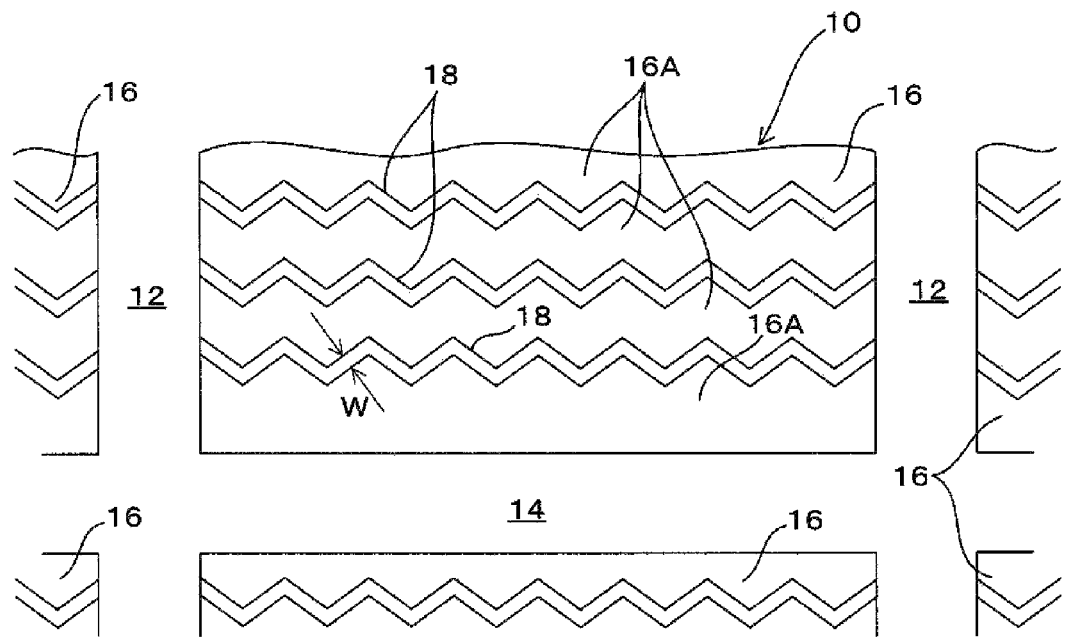
FIG. 4A is a plan view of the portions of a block.

As illustrated in FIG. 4A, a shape in the longitudinal direction of the sipes 18 may be set as desired and, for example, may extend in a zigzag shape.

Figures 5A, 5B, 5C:
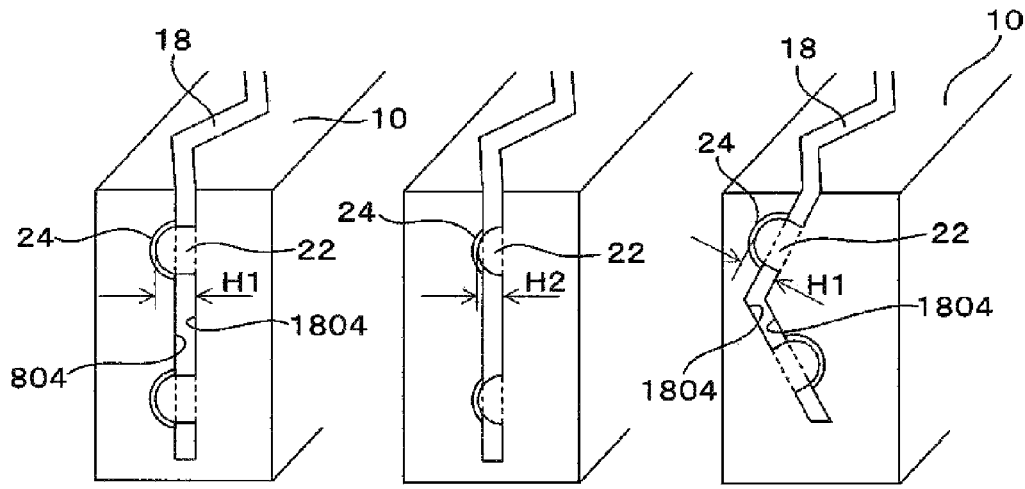
FIGS. 5A to 5F are explanatory views of the sipe, the protrusions, and the recesses; and are also perspective views of cross-sections of the portions of the block.
Figures 5D, 5E, 5F:
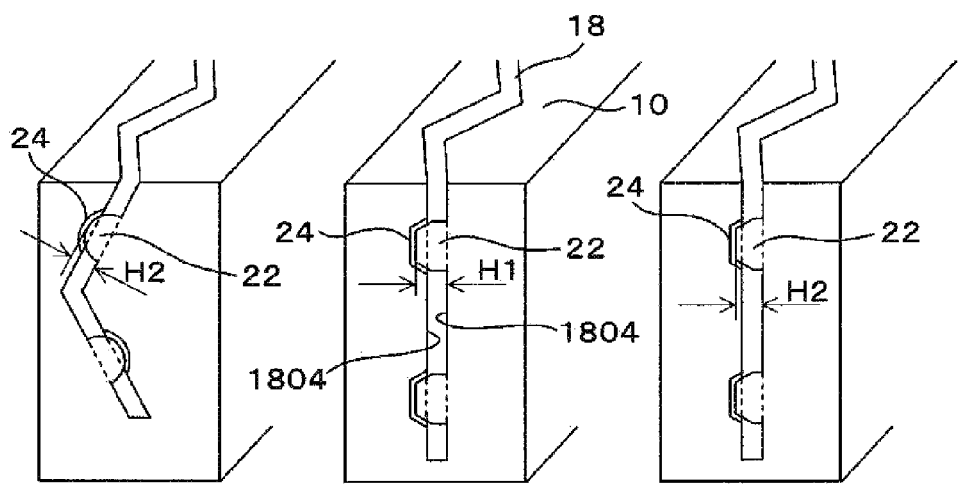

As illustrated in FIGS. 5A, 5B, 5E, and 5F, a depth of the sipes 18 may extend linearly in a direction perpendicular to the tread surface 10, or alternately, as illustrated in FIGS. 5C and 5D, may extend in a bent manner from the tread surface 10.

With this embodiment, the sipes 18 have a uniform depth in the longitudinal direction thereof, with the exception of both ends. Both ends are configured so as to have a bottom-raising portion 1802 where a bottom surface is gradually raised.

In the sipes 18, protrusions 22 are formed on a first sipe wall surface of mutually opposing sipe wall surfaces 1804 and recesses 24 that engage with the protrusions 22 are formed in a second sipe wall surface. Collapsing of portions 16A of the block 16 sandwiched by the sipes 18 is suppressed due to the engaging of the protrusions 22 and the recesses 24.

Specifically, a plurality of the protrusions 22 and the recesses 24 is provided in the longitudinal direction of the sipes 18 and the depth direction of the sipes 18 at an interval.

The protrusions 22 have a height in a direction perpendicular to the sipe wall surfaces 1804.

As illustrated in FIGS. 5B and 5D, the protrusions 22 may be provided with a hemispherical shape. Alternately, as illustrated in FIGS. 5A and 5C, the portions of the protrusions 22 protruding from the sipe wall surfaces 1804 may be provided with a cylindrical shape and the ends thereof may be provided with a hemispherical shape. Furthermore, as illustrated in FIGS. 5E and 5F, portions of the protrusions 22 protruding from the sipe wall surfaces 1804 may be provided with a cylindrical shape and the ends thereof may be provided with a truncated conical shape. In short, it is sufficient that the protrusions 22 and the recesses 24 be provided with shapes that mutually engage when the portions 16A of the block 16 collapse so as to suppress the collapsing of the portions 16A of the block 16.

Figure 4B:
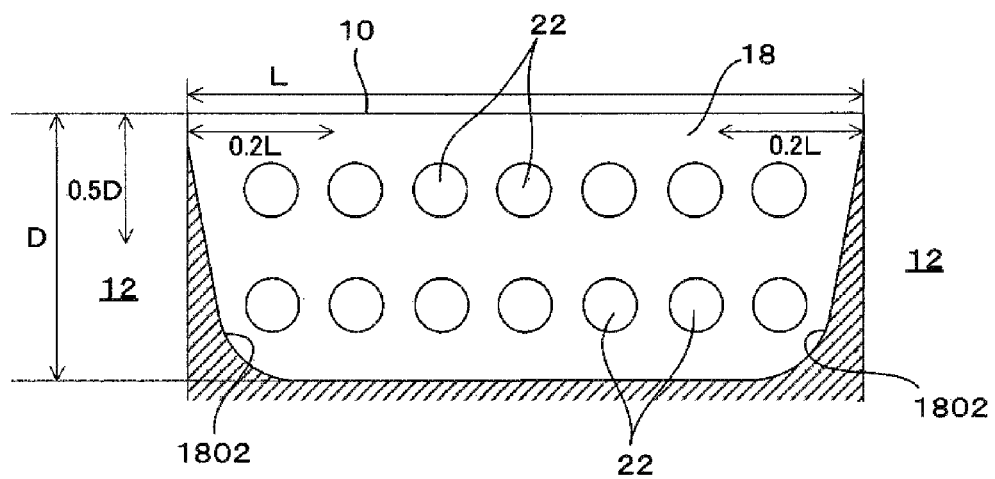
FIG. 4B is a cross-sectional view cut at a portion of the sipe and is also an explanatory view of the protrusions.

In the case of the sipes 18 illustrated in FIGS. 4A and 4B, both ends in the longitudinal direction of the sipes 18 are positioned at edges of the block 16. Therefore, the portions 16A of the block 16 that are sandwiched by the sipes 18 and are positioned at both ends in the longitudinal direction of the sipes 18 are more prone to collapsing than the portions 16A of the block 16 that are positioned intermediately in the longitudinal direction of the sipes 18. Additionally, in cases where the ends in the longitudinal direction of the sipes 18 are open, the portions 16A of the block 16 that are positioned at the ends in the longitudinal direction of the sipes 18 are more prone to collapsing than the portions 16A of the block 16 that are positioned intermediately in the longitudinal direction of the sipes 18.

Figure 6A:
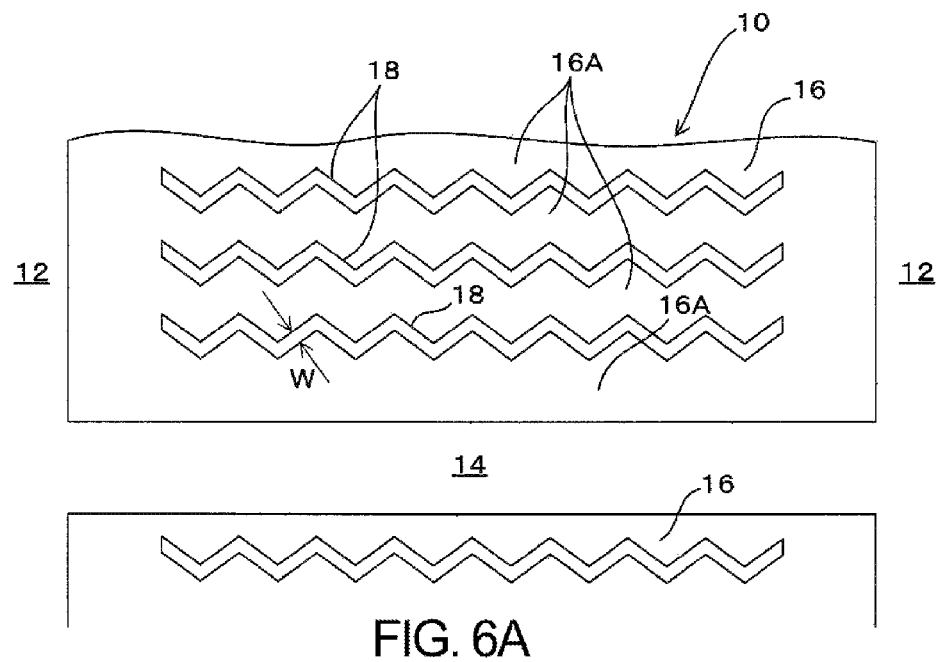
FIG. 6A is a plan view of the portions of a block.
Figure 6B:
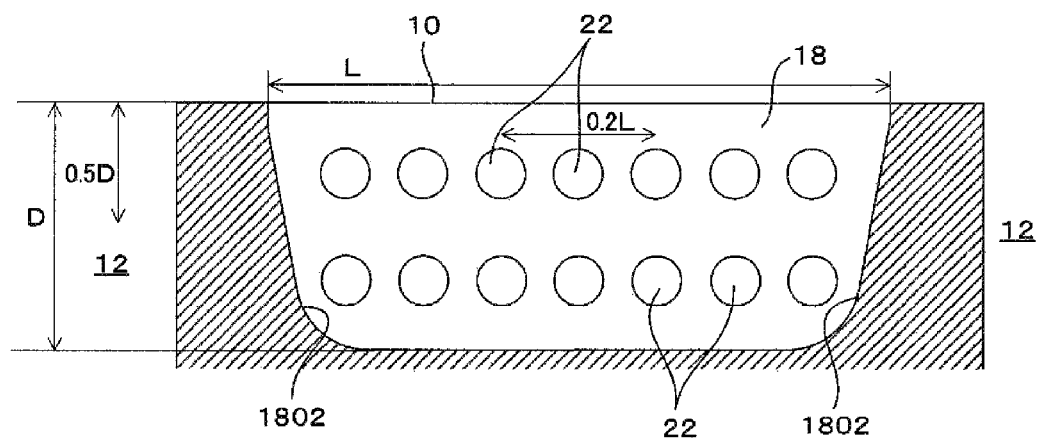
FIG. 6B is a cross-sectional view cut at a portion of a sipe and is also an explanatory view of the protrusions.

Alternately, in the case of the sipes 18 illustrated in FIGS. 6A and 6B, dimensions in the longitudinal direction of the sipes 18 are large, and the portions 16A of the block 16 positioned in a central portion in the longitudinal direction of the sipes 18 are more prone to collapsing than the portions 16A of the block 16 positioned at other areas.

In this embodiment, when there are portions 16a of the block 16 in the longitudinal direction of the sipes 18 that are more prone to collapse compared with other areas, the height of the protrusions 22 is configured so as to vary (instead of being uniform) in the longitudinal direction of the sipes 18, and thus configured so that the portions 16A of the block 16 collapse uniformly in the longitudinal direction of the sipes 18.

Thereby, a sipe bottom-raising effect in the area of the portions 16A of the block 16 that are prone to collapsing can be obtained, and a decline of the rigidity of the block 16 can be suppressed when the tire is worn without reducing the number of sipe edges. Therefore, edge effect can be increased, which is beneficial for enhancing braking performance on ice.

To explain more specifically, as illustrated in FIGS. 4A and 4B, when the portions 16A of the block 16 positioned at both ends in the longitudinal direction of the sipes 18 are more prone to collapsing than the portions 16A of the block 16 that are positioned intermediately in the longitudinal direction of the sipes 18, as illustrated in FIG. 4B and FIGS. 5A to 5F, at the ends of the sipes 18, the height H1 of the protrusions 22, which are positioned in a region 20% of a length of the sipes 18 from the ends in the longitudinal direction of the sipes 18, is formed so as to be greater than the height H2 of the protrusions 22 that are positioned in other areas. In other words, when the length of the sipes 18 is L, the height H1 of the protrusions 22, which are positioned in the area 0.2L from the ends of the sipes 18 in the longitudinal direction, is formed so as to be greater than the height H2 of the protrusions 22 that positioned in other areas.

As a result, a sipe bottom-raising effect at the ends of the sipes 18 can be obtained and, therefore, a decline of the rigidity of the block 16 can be suppressed when the tire is worn without reducing the number of sipe edges.

In this case, the height H2 of the protrusions 22 that are positioned in other areas is preferably from 0.5 mm to 1.5 mm; and the height H1 of the protrusions 22, which are positioned in the region 20% of the length L of the sipes 18 from the ends in the longitudinal direction of the sipes 18, is preferably from 0.5 mm to 3.0 mm greater than the height H2.

Additionally, as illustrated in FIGS. 6A and 6B, when the portions 16A of the block 16 positioned at a center portion in the longitudinal direction of the sipes 18 are more prone to collapsing than the portions 16A of the block 16 that are positioned in other areas, as illustrated in FIG. 6B and FIGS. 5A to 5F, the height H1 of the protrusions 22, which are positioned in the center of the sipes 18 in the longitudinal direction and that are in a region in a range of 20% of the length of the sipes 18 from the ends in the longitudinal direction, is formed so as to be greater than the height H2 of the protrusions 22 positioned in other areas. In other words, when a length of the sipes 18 is L, the height H1 of the protrusions 22, which are positioned in the center of the sipes 18 in the longitudinal direction and that are in the area 0.2L, is formed so as to be greater than the height H2 of the protrusions 22 positioned in other areas.

As a result, a sipe bottom-raising effect at the center of the sipes 18 can be obtained and, therefore, a decline of the rigidity of the block 16 can be suppressed when the tire is worn without reducing the number of sipe edges.

In this case, the height H2 of the protrusions 22 that are positioned in other areas is preferably from 0.5 mm to 1.5 mm; and the height H1 of the protrusions 22, which are positioned in the region 20% of the length L of the sipes 18 from the ends in the longitudinal direction, is preferably from 0.5 mm to 3.0 mm greater than the height H2.

Example 2

Radial studless tires having a tire size of 195/65R15 provided with protrusions 22 having the configurations shown in FIG. 7 and recesses 24 that engage with these protrusions 22 were assembled on rims having a rim size of 15×6J. The tires were inflated to an inner pressure of 200 kPa and mounted on the four wheels of an RV vehicle having an engine displacement of 2,000 cc. Tests for a Conventional Examples 1, 2, and 3 and Working Examples 1, 2, and 3 were conducted for dry braking and braking on ice.

Note that the width W of the sipes 18 was 0.4 mm and the depth D was 6 mm.

Additionally, the length L of the sipes 18 in Conventional Example 1 and Working Example 1 was 15 mm, in Conventional Example 2 and Working Example 2 was 20 mm, and in Conventional Example 3 and Working Example 3 was 30 mm.

Conventional Example 1 and Working Example 1 are cases in which both ends in the longitudinal direction of the sipes 18 are positioned at edges of the block 16. Therefore, the portions 16A of the block 16 that are positioned at both ends in the longitudinal direction of the sipes 18 are more prone to collapsing than the portions 16A of the block 16 that are positioned intermediately in the longitudinal direction of the sipes 18.

Conventional Example 2 and Working Example 2 are cases in which dimensions in the longitudinal direction of the sipes 18 are large, and the portions 16A of the block 16 positioned in a central portion in the longitudinal direction of the sipes 18 are more prone to collapsing than the portions 16A of the block 16 positioned at other areas.

Conventional Example 3 and Working Example 3 are cases in which the dimensions in the longitudinal direction of the sipes 18 are large, and both ends in the longitudinal direction of the sipes 18 are positioned at edges of the block 16. Therefore, the portions 16A of the block 16 that are positioned at both ends in the longitudinal direction of the sipes 18 and the portions 16A of the block 16 that are positioned at the center portion in the longitudinal direction of the sipes 18 are more prone to collapsing than the portions 16A of the block 16 that are positioned in other areas.

Additionally, the protrusions at both ends, when the length of the sipes 18 is L, are the protrusions 22 that are positioned in the region 0.2L from the ends of the sipes 18 in the longitudinal direction; and the protrusions at the center portion, when the length of the sipes 18 is L, are the protrusions 22 that are positioned in the center of the sipes 18 in the longitudinal direction and that are in the area 0.2L.

Dry braking was measured as a braking distance from a point of brake application to stop when travelling on a dry asphalt road surface at a speed of 100 km/h. Using the reciprocal of the braking distance, the results were expressed as index values with an index value of the Conventional Example being 100. Larger index values indicate superior braking performance.

Braking on ice was measured as a braking distance from a point of brake application to stop when travelling on ice at a speed of 40 km/h. Using the reciprocal of the braking distance, the results were expressed as index values with an index value of the Conventional Example being 100. Larger index values indicate superior braking performance.

It is clear from Working Examples 1, 2, and 3 shown in FIG. 7 that dry braking and braking on ice can be enhanced by configuring the height of the protrusions 22 so as to vary in the longitudinal direction of the sipes 18 so that the portions 16A of the block 16 collapse uniformly in the longitudinal direction of the sipes 18 when there are portions 16a of the block 16 in the longitudinal direction of the sipes 18 that are more prone to collapse compared with other areas.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A pneumatic tire provided with a plurality of vertical grooves extending in a tire circumferential direction in a tread surface and a sipe extending in a tire width direction in a land portion partitioned by the vertical grooves, wherein,
    in the sipe, protrusions are formed on a first sipe wall surface of mutually opposing sipe wall surfaces and recesses that engage with the protrusions are formed on a second sipe wall surface;
    the protrusions have a height in a direction perpendicular to the sipe wall surface,
    a height of protrusions positioned on an upper portion in a depth direction of the sipe is greater than a height of protrusions positioned on a lower portion,
    the protrusions comprise at least one of a hemispherical shape, a cylindrical shape with ends thereof having a hemispherical shape, or a cylindrical shape with ends thereof having a truncated conical shape, and
    a diameter of a base of the protrusions on the upper portion is substantially equal to a diameter of a base of the protrusions on the lower portion.

2. The pneumatic tire according to claim 1, wherein the protrusions positioned on the upper portion in the depth direction of the sipe are protrusions positioned in a range of 50% of a maximum depth of the sipe from the tread surface.

3. The pneumatic tire according to claim 1, wherein one or both ends in the longitudinal direction of the sipe is positioned at an end of the land portion, and
    a height of the protrusions positioned in a region 20% of a sipe length from the one or both ends in the longitudinal direction of the sipe is greater than a height of the protrusions positioned in other regions.

4. The pneumatic tire according to claim 1, wherein a sipe length is great and a portion of the block positioned in a center in the longitudinal direction of the sipe is prone to collapse, and a height of the protrusions positioned in a region 20% of the sipe length in the center in the longitudinal direction of the sipe is greater than a height of the protrusions positioned in other regions.

5. The pneumatic tire according to claim 1, wherein a width of the sipes is at least 0.3 mm.

6. The pneumatic tire according to claim 1, wherein a width of the sipes 1.5 mm or less.

7. The pneumatic tire according to claim 1, wherein a width of the sipes is between 0.3 mm and 1.5 mm.

8. The pneumatic tire according to claim 1, wherein a height of the protrusions positioned on the lower portion is from 0.5 mm to 1.5 mm.

9. The pneumatic tire according to claim 1, wherein a height of the protrusions positioned on the upper portion is from 0.5 mm to 3.0 mm greater than a height of the lower protrusions.

10. The pneumatic tire according to claim 1, wherein a height of the protrusions positioned on the upper portion is from 1.0 mm to 4.5 mm.

11. The pneumatic tire according to claim 1, wherein a height of the height of the protrusions positioned on the lower portion is from 0.5 mm to 1.5 mm and a height of the protrusions positioned on the upper portion is from 0.5 mm to 3.0 mm greater than a height of the lower protrusions.

12. The pneumatic tire according to claim 1, wherein a shape in the longitudinal direction of the sipes is a zigzag shape.

13. The pneumatic tire according to claim 1, wherein a depth of the sipes extends in a bent manner from the tread surface.

14. The pneumatic tire according to claim 1, wherein a depth of the sipes extends linearly in a direction perpendicular to the tread surface.

15. The pneumatic tire according to claim 1, wherein the sipes have a uniform depth in the longitudinal direction thereof, with the exception of ends of the sipes which have a bottom-raising portion where a bottom surface is gradually raised.

16. The pneumatic tire according to claim 1, wherein the protrusions on the upper portion comprise the cylindrical shape with ends thereof having the hemispherical shape or with ends thereof having the truncated conical shape, and the height of the protrusions is adjusted by the height of a part of the cylindrical shape.

17. A pneumatic tire provided with a plurality of vertical grooves extending in a tire circumferential direction in a tread surface and a sipe extending in a tire width direction in a land portion partitioned by the vertical grooves, wherein, in the sipe, protrusions are formed on a first sipe wall surface of mutually opposing sipe wall surfaces and recesses that engage with the protrusions are formed on a second sipe wall surface;

the protrusions have a height in a direction perpendicular to the sipe wall surface, the height of the protrusions varies in a longitudinal direction of the sipe so that portions of the block partitioning the sipe collapse uniformly in the longitudinal direction of the sipe, the protrusions comprise at least one of a hemispherical shape, a cylindrical shape with ends thereof having a hemispherical shape, or a cylindrical shape with ends thereof having a truncated conical shape, and a diameter of a base of the protrusions with the height varied in the longitudinal direction is substantially constant.

18. The pneumatic tire according to claim 17, wherein one or both ends in the longitudinal direction of the sipe is positioned at an end of the land portion, and a height of the protrusions positioned in a region 20% of a sipe length from the one or both ends in the longitudinal direction of the sipe is greater than a height of the protrusions positioned in other regions.

19. The pneumatic tire according to claim 17, wherein a sipe length is great and a portion of the block positioned in a center in the longitudinal direction of the sipe is prone to collapse, and a height of the protrusions positioned in a region 20% of the sipe length in the center in the longitudinal direction of the sipe is greater than a height of the protrusions positioned in other regions.

20. The pneumatic tire according to claim 17, wherein protrusions are positioned on an upper portion in the depth direction of the sipe in a range of 50% of a maximum depth of the sipe from the tread surface, and wherein a height of the protrusions positioned on the upper portion in the depth direction of the sipe is greater than a height of protrusions positioned on a lower portion in the depth direction of the sipe.

* * * * *